US005206509A

United States Patent [19]

McLuckey et al.

[11] Patent Number: 5,206,509

[45] Date of Patent: Apr. 27, 1993

[54] UNIVERSAL COLLISIONAL ACTIVATION ION TRAP MASS SPECTROMETRY

[75] Inventors: Scott A. McLuckey; Douglas E. Goeringer; Gary L. Glish, all of Oak Ridge, Tenn.

[73] Assignee: Martin Marietta Energy Systems, Inc., Oak Ridge, Tenn.

[21] Appl. No.: 805,442

[22] Filed: Dec. 11, 1991

[51] Int. Cl.[5] ........................ B01D 59/44; H01J 49/00

[52] U.S. Cl. ...................................... 250/292; 250/282

[58] Field of Search ................ 250/281, 282, 291, 292

[56] References Cited

U.S. PATENT DOCUMENTS 4,686,367 8/1987 Louris et al. ........................ 250/291
4,736,101 4/1988 Syka et al. .......................... 250/292
4,749,860 6/1988 Kelly et al. .......................... 250/282
4,755,670 7/1988 Syka et al. .......................... 250/292
4,945,234 7/1990 Goodman et al. .................. 250/292

OTHER PUBLICATIONS

J. E. Fulford et al., "Radio-Frequency Mass-Selective Excitation & Resonant Ejection of Ions in a Three-Dimensional Quadrupole Ion Trap," Journal of Vacuum Science and Technology, 17(4), 829 (1980).

R. B. Cody et al., "Collision-Induced Dissociation with Fourier Transform Mass Spectrometry," Analytical Chemistry, 54, 96 (1982).

J. N. Louris et al., "Instrumentation, Applications & Energy Deposition in Quadrupole Ion Trap Tandem Mass Spectrometry," Anal. Chem, 59, 1677 (1987).

N. A. Yates et al., "Resonant Excitation for GC/MS/MS in the Quadrupole Ion Trap via Frequency Assignment Pre-Scans and Broadband Excitation," Proceedings of the 39th ASMS Conf. on Mass Spec. & App. Topics, May 1991, Nashville, Tenn., p. 132.

C. F. Ijames, et al., "Fourier Transform Mass Spectrometry Using Randon-Noise Excitation," Chemical Physics Letters, 108, 58 (1984).

S. A. McLuckey et al., "Simultaneous Monitoring for Parent Ions of Targeted Product Ions: A Method for Rapid Screening Using Mass Spectrometry/Mass Spectrometry," Analytical Chemistry, 62, 56 (1990).

*Primary Examiner*—Bruce C. Anderson
*Attorney, Agent, or Firm*—Joseph A. Marasco; Harold W. Adams

[57] ABSTRACT

A universal collisional activation ion trap comprises an ion trapping means containing a bath gas and having connected thereto a noise signal generator. A method of operating a universal collisional activation ion trap comprises the steps of: providing an ion trapping means; introducing into the ion trapping means a bath gas; and, generating a noise signal within the ion trapping means; introducing into the ion trapping means a substance that, when acted upon by the noise signal, undergoes collisional activation to form product ions.

18 Claims, 9 Drawing Sheets

UNIVERSAL COLLISIONAL ACTIVATION ION TRAP MASS SPECTROMETRY

The U.S. Government has rights in this invention pursuant to contract no. DE-AC05-84OR21400 between the U.S. Department of Energy and Martin Marietta Energy Systems, Inc., and funded by the Office of Safeguards and Security.

FIELD OF THE INVENTION

The present invention relates to collisional activation ion trapping instruments and methods of using same, and more particularly to universal collisional activation ion trap mass spectrometers and methods of using same.

BACKGROUND OF THE INVENTION

Deliberate dissociation of ions via collision-induced dissociation (CID) is a useful technique for verification of molecular entities in mass spectrometers including those based on ion trapping. Collisional activation (CA), which constitutes the first step of CID (dissociation being the second step), can be effected in ion trapping instruments by resonantly exciting ions at one or more of their characteristic frequencies of motion within the trapping field.

Because the frequencies of ion motion are mass-to-charge dependent, the use of a single excitation frequency makes collisional activation in ion trapping instruments mass-to-charge specific. Consequently, a priori knowledge of the mass-to-charge ratio for a selected ion has been required in order that the excitation frequency can be correctly adjusted. Furthermore, the frequencies of ion motion are affected by the presence of other ions of like charge (i.e., space charge) which limits the usefulness of the single frequency excitation methods commonly used in conventional ion trapping instruments.

Single frequency excitation methods as used in ion traps employ a discrete, precisely-tuned frequency to excite a limited number of ions possessing a particular mass-to-charge ratio. Also, in many conventional ion trapping applications, the number of ions is difficult to control which necessitates frequency adjustments that are generally tedious and time-consuming. Furthermore, the extent of fragmentation, which provides structural information, is often limited because once the parent ion becomes fragmented, the first generation product ions fall out of resonance and typically do not undergo further fragmentation. Further background information can be found in the following references, all of which are incorporated herein by reference: J. E. Fulford, et al., "Radio-frequency mass-selective excitation and resonant ejection of ions in a three-dimensional quadrupole ion trap", *Journal of Vacuum Science and Technology*, 17(4), 829 (1980); R. B. Cody, et al., "Collision-Induced Dissociation with Fourier Transform Mass Spectrometry", *Analytical Chemistry*, 54, 96(1982); J. N. Louris, et al., "Instrumentation, Applications and Energy Deposition in Quadrupole Ion Trap Tandem Mass Spectrometry", *Analytical Chemistry*, 59, 1677 (1987); and Syka, et al. "Method of Operating Ion Trap Detector in MS/MS Mode", U.S. Pat. No. 4,736,101.

Yates et al. have described the use of rapid frequency pre-scans over a narrow mass range (1.7 amu) to determine empirically the parent ion resonant frequency in an automated fashion. These workers have also described the use of a supplementary signal with a range in frequency of 10 kHz, equivalent to a mass/charge range of 1.7 at a $q_z$ value of 0.3. Both approaches were found to deal effectively with the space charge problem but neither deals with the problems of limited fragmentation and inability to fragment ions simultaneously over a range of mass/charge values. Further information can be found in N. A. Yates et al., "Resonant Excitation for GC/MS/MS in the Quadrupole Ion Trap via Frequency Assignment Pre-Scans and Broadband Excitation," *Proceedings of the 39th ASMS Conference on Mass Spectrometry and Applied Topics*, May 1991, Nashville, Tenn., p. 132.

Random-noise excitation has been used in Fourier transform ion cyclotron resonance mass spectrometry as part of the final detection/mass analysis step, but not as a means for inducing fragmentation of ions. Random noise was used to kinetically excite all ions in the ion cyclotron resonance mass spectrometer to higher orbits in order to allow their detection by the image currents they induce in receiver plates. In such an application, vacuum conditions are necessary; collisions with background or bath gases have a pernicious effect upon the detection method. Further information can be found in C. F. Ijames, et al., "Fourier Transform Mass Spectrometry Using Random-Noise Excitation", *Chemical Physics Letters*, 108, 58 (1984).

Non-selective collisional activation was used in the rapid screening technique described in S. A. McLuckey, et al., "Simultaneous Monitoring for Parent Ions of Targeted Product Ions: A Method for Rapid Screening Using Mass Spectrometry/Mass Spectrometry", *Analytical Chemistry*, 62, 56 (1990), which is incorporated herein by reference. The experiments reported therein were carried out with a non-trapping instrument and illustrate the usefulness of non-selective, universal collisional activation.

There is a need for apparatus and a method for collisional activation ion trapping which overcomes the problem of frequency shifts due to space charge and enables simultaneous kinetic excitation of trapped ions having a wide range of mass-to-charge ratios. There is also a need for apparatus and a method for collisional activation ion trap mass spectrometry wherein CID can be performed in a universal manner without time-consuming frequency adjustments.

OBJECTS OF THE INVENTION

Accordingly, it is an object of the present invention to provide a new and improved apparatus and method for collisional activation ion trap mass spectrometry which overcomes the problem of frequency shifts due to space charge and enables simultaneous kinetic excitation of trapped ions having a wide range of mass-to-charge ratios.

It is another object of the present invention to provide a new and improved apparatus and method for collisional activation ion trap mass spectrometry wherein CID can be performed in a universal manner without time-consuming frequency adjustments.

Further and other objects of the present invention will become apparent from the description contained herein.

SUMMARY OF THE INVENTION

In accordance with one aspect of the present invention, the foregoing and other objects are achieved by a universal collisional activation ion trap which comprises an ion trapping means having connected thereto a noise signal generator, the ion trapping means containing a bath gas.

In accordance with another aspect of the present invention, a universal collisional activation ion trap comprises a quadrupole ion trap containing a bath gas, a noise signal generator connected to the quadrupole ion trap for generating a noise signal within the the quadrupole ion trap.

In accordance with a further aspect of the present invention, a method of operating a universal collisional activation ion trap comprises the steps of:

(a) providing an ion trapping means;

(b) introducing into the ion trapping means a bath gas; and, (c) generating a noise signal within the ion trapping means to effect collisional activation of ions trapped therein.

For a better understanding of the present invention, together with other and further objects, advantages and capabilities thereof, reference is made to the following disclosure and appended claims in connection with the above-described drawings.

DETAILED DESCRIPTION OF THE INVENTION

The invention described herein is effective for any ion trapping type of instrument in which ions execute periodic motion. This includes, but is not limited to, known devices such as multi-pole electrodynamic ion traps, e.g. quadrupole ion traps, and combined magnetic and electrostatic ion traps, e.g. ion cyclotron resonance spectrometer. Other and varying embodiments of the apparatus and method are possible for other types of ion traps, all of which fall within the scope of the present invention.

Figure 1:
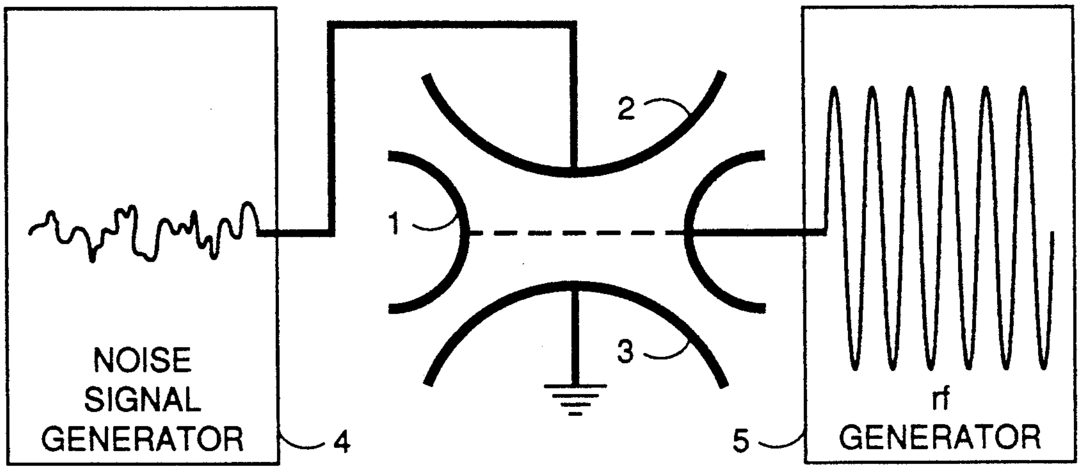
FIG. 1 is a schematic representation of the subject apparatus wherein the noise signal is applied to one end-cap electrode of a quadrupole ion trap.
Figure 2:
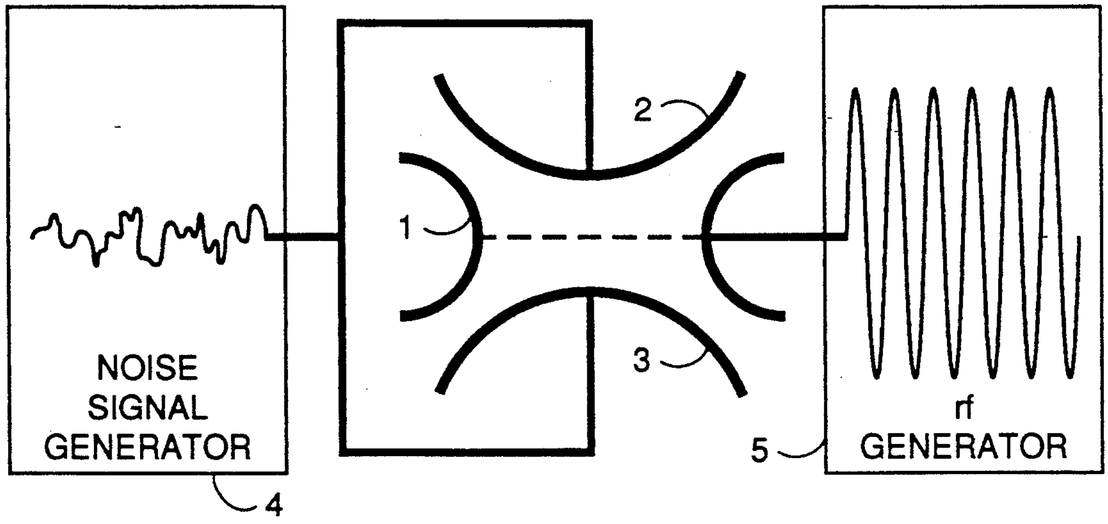
FIG. 2 is a schematic representation of the subject apparatus wherein the noise signal is applied to both end-cap electrodes of a quadrupole ion trap.

Quadrupole ion traps are well known. Referring to FIG. 1, an ion trap is generally comprised of a center ring electrode 1 and two end-cap electrodes 2,3. To effect universal CID in a monopolar excitation mode, a noise signal generator 4 is connected to one end-cap electrode 2, the other end-cap electrode 3 being grounded. A radio-frequency (rf) generator 5 is connected to the ring electrode to supply the ion trap radiofrequency drive voltage which provides the alternating quadrupole field necessary for ion trapping. Referring now to FIG. 2, the noise signal generator can also be connected to both end-cap electrodes 2, 3, allowing the noise signal to be generated in-phase for quadrupolar excitation, or 180° out-of-phase for dipolar excitation. The configurations shown in FIGS. 1 and 2 will result in axial modulation.

In another embodiment of the invention, not illustrated, the noise signal can be applied to the ring electrode, along with the main ion trapping voltage. In this configuration, radial modulation and excitation will be achieved.

Figure 3:
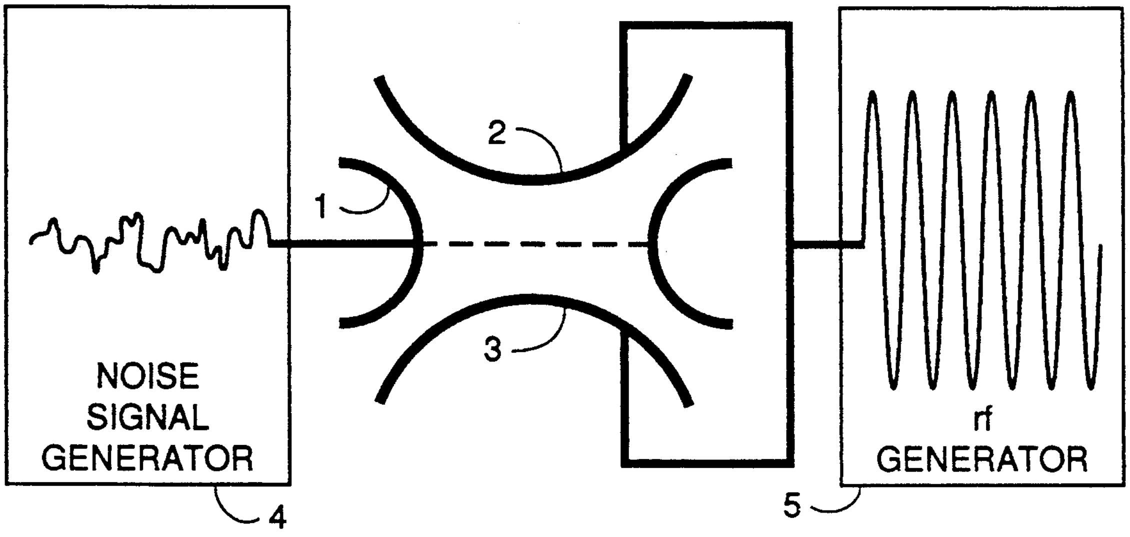
FIG. 3 is a schematic representation of the subject apparatus wherein the noise signal is applied to the ring electrode of a quadrupole ion trap.

In another embodiment of the invention, shown in FIG. 3, The main trapping voltage can also be applied to the end-cap electrodes 2, 3 while the noise signal is connected to the ring electrode 1. In this configuration, monopolar excitation and radial modulation will be achieved.

Figure 4:
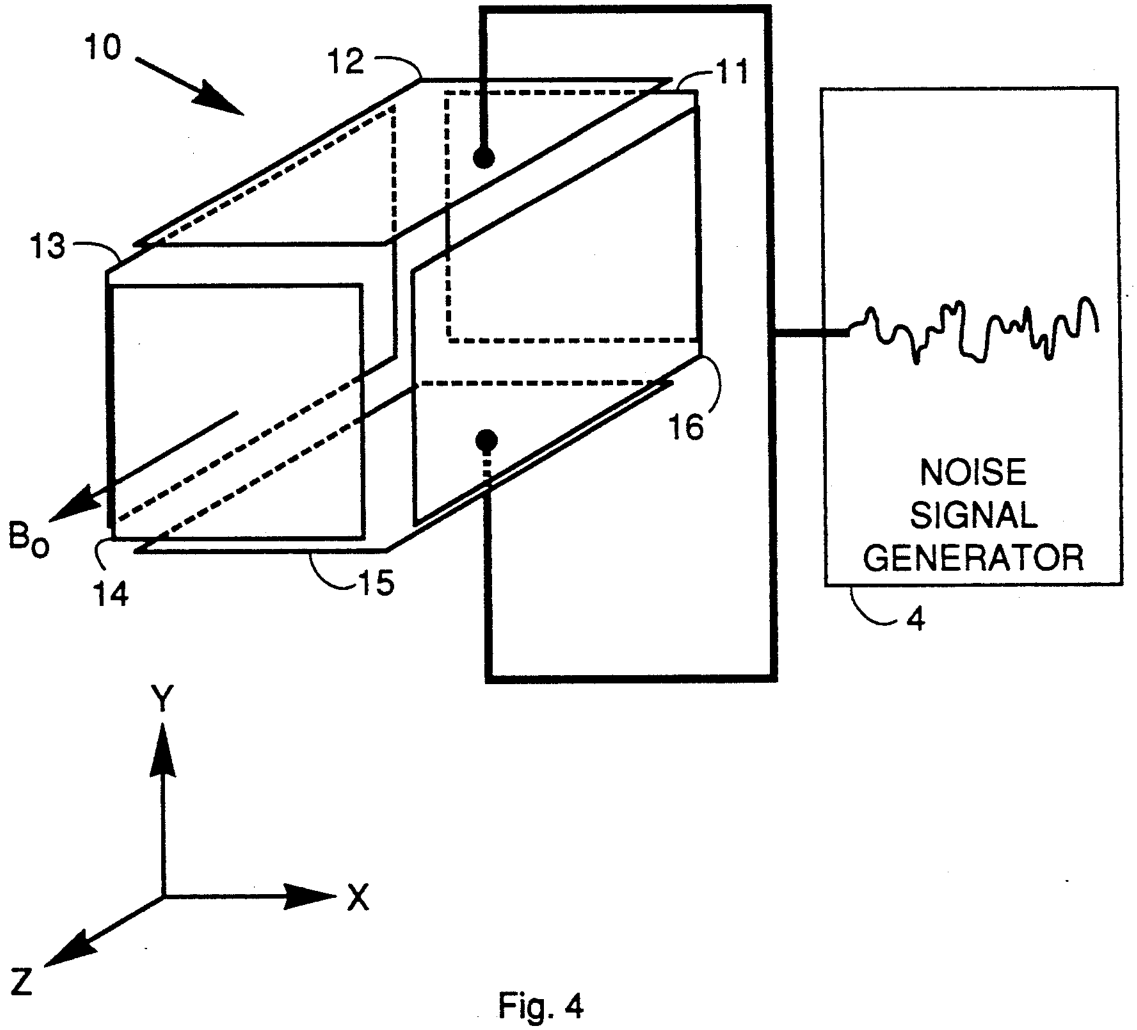
FIG. 4 is a schematic representation of the subject apparatus wherein the noise signal is applied to opposing plates of an ion cyclotron resonance cell.

A further embodiment of the invention is shown in FIG. 4. An ion cyclotron resonance cell 10 is typically comprised of six plates 11–16 defining a box shape which is located within a magnetic field, $B_o$. The magnetic field, $B_o$, confines ions in the x-y plane and electrostatic trapping plates confine ions in the z-direction. Universal collisional activation can be effected by applying noise 180° out-of-phase to either set of opposing plates which define the x-y plane. Kinetic excitation by noise can also be effected by application to the z-direction trapping plates.

Having described the preferred embodiments of the apparatus, a preferred method for universal collisional activation of ions in an ion trapping instrument will now be set forth.

Ions are accumulated in the ion trap either by injection or by direct formation within the ion trapping volume. Ions of a single mass-to-charge or a wide range of mass-to-charge independent of ion number are kinetically excited by a random-noise modulation signal applied to one or more electrodes comprising the ion trap. Because such a modulation signal has a continuous, wide-band frequency spectrum, the entire mass-to-charge range of the trapped ions undergoes simultaneous, nonspecific kinetic excitation. The amplitude of the noise signal is sufficient to cause ions to experience energetic collisions with the bath, or background gas in the ion trap while remaining in the trapping field.

The trapped ions absorb power and undergo energetic collisions with the bath gas. Collisions with the bath gas serve as a mechanism for power dissipation. Some of the absorbed power goes into increasing the kinetic energy of the bath gas atoms or or molecules that undergo collision and some energy goes into internal modes of the ion, if it is polyatomic. The ions are thereby internally heated until they undergo dissociation and produce fragments, or product ions. The product ions become resonant and undergo kinetic excitation and heating and may then also undergo further, or secondary dissociation. Successive generations of dissociation may continue.

Important experimental variables that will determine the appropriate power and duration of the noise signal are the strength of the trapping field, the pressure of the bath gas, and the propensity of the analyte ion for fragmentation. The optimum values for these variables for a particular analyte can be determined by routine experimentation.

Following the dissociation process, the noise signal is terminated and a mass spectrum is acquired by one of a variety of conventional means. The final spectrum then may show ions that survived the collisional activation process, first generation product ions, and successive generations of product ions.

The invention enables simultaneous kinetic excitation of stored ions having multiple, unidentified mass-to-charge ratios and a wide range of number densities (space charge). Thus, collisional activation can be effected in a non-selective manner without regard to ion number density and without prior knowledge of the parent ion mass-to-charge ratio. Parent and product ions are always "in resonance" so that more extensive fragmentation is typically observed without recourse to multiple single frequency excitation steps and the concomitant tuning.

The invention is especially beneficial when implemented with a quadrupole ion trap in monopolar, dipolar, quadrupolar, and radial modulation modes. The invention is useful as a means for inclucing fragmentation of a wide variety of ions, independent of mass and ion number, particularly for analytical applications of ion trap mass spectrometers. This is a rapidly growing field which has already extended to environmental and biological analyses. The invention facilitates rapid analysis of samples with components not previously identified. Potential applications of interest include explosives detection, drug detection, and rapid environmental analysis of organic and other polyatomic species. The following examples are intended to illustrate the wide applicability of the method.

EXAMPLE I

Figure 5A:
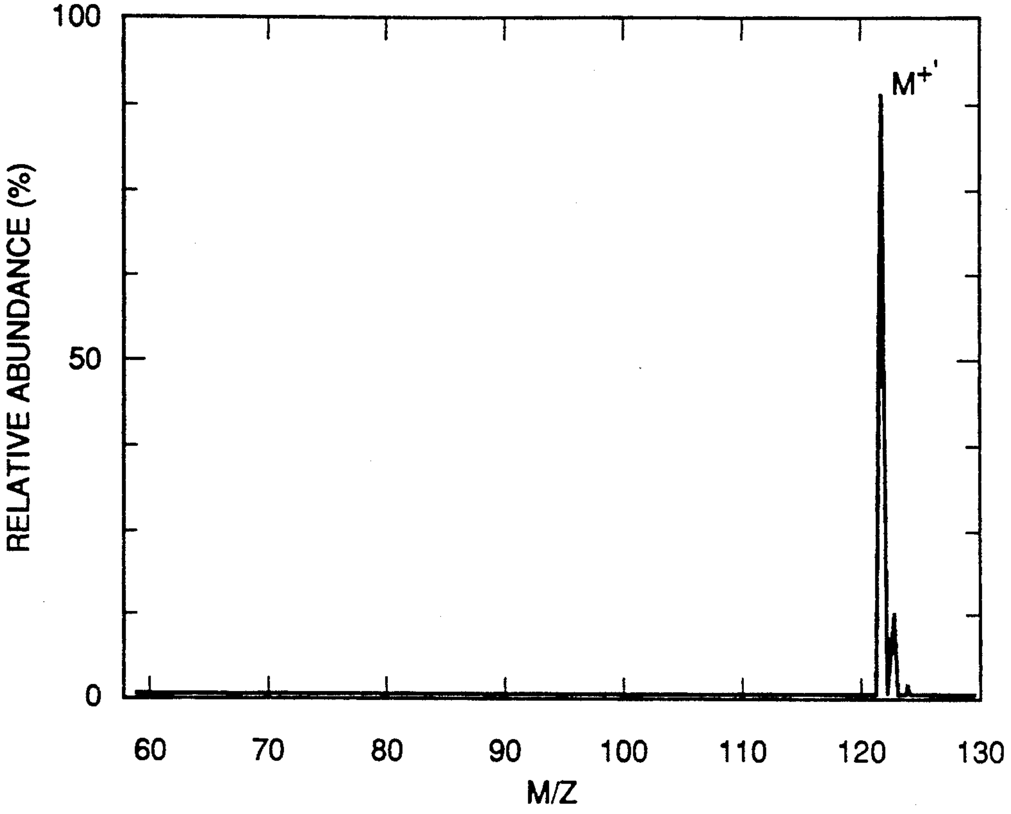
FIG. 5*a* shows the mass spectrum of the isolated radical cation of N,N-dimethylaniline, with no activation applied.
Figure 5B:
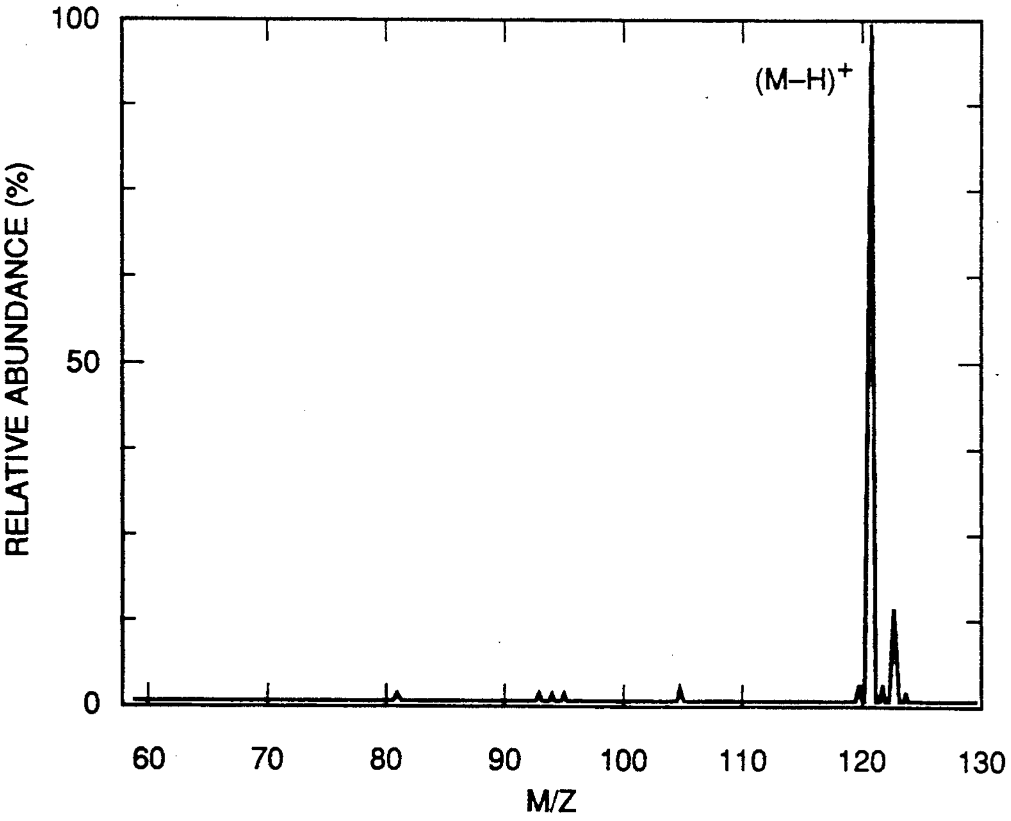
FIG. 5*b* shows the mass spectrum of the same compound resulting from the use of a conventional single frequency activation method.
Figure 5C:
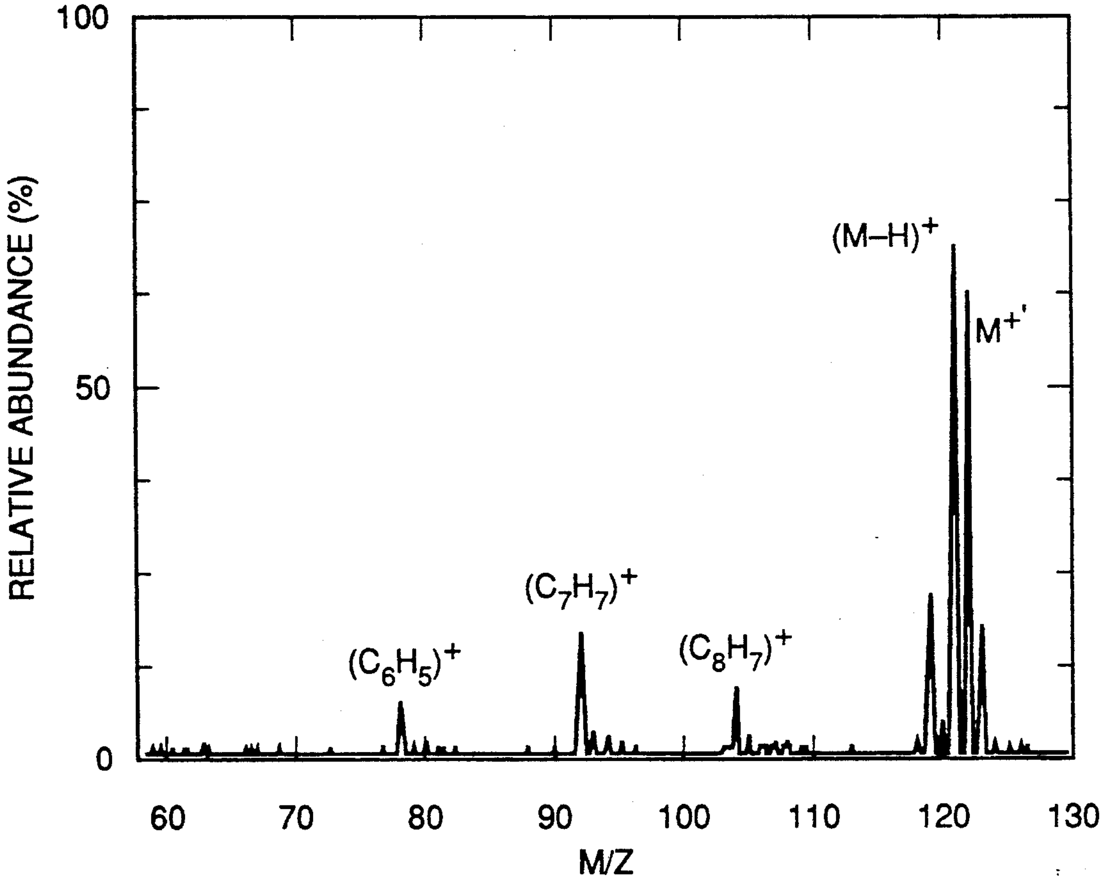
FIG. 5*c* shows the spectrum of the same compound acquired according to the present invention.

N,N-dimethylaniline, a compound typical of many of environmental interest, was analyzed according to the present invention. FIG. 5*a* shows the spectrum of the isolated radical cation of N,N-dimethylaniline. FIG. 5*b* shows the spectrum resulting from the conventional single frequency method for collisional activation in ion traps. Note that the parent ion shows only one product ion corresponding to the loss of a hydrogen atom. The rationale behind using collisional activation is usually to produce a spectrum that allows unambiguous identification of the compound. The loss of a hydrogen atom is not particularly informative in this regard. FIG. 5*c* shows the spectrum after a 20 V p-p random noise signal was applied to the ion trap for 40 milliseconds prior to spectrum acquisition. Note that a variety of product ions are formed that would allow for identification from a library search. The latter spectrum is more informative than the former due to the fact that the first generation product ion also falls into resonance with the universal method whereas it falls out of resonance with the conventional method.

EXAMPLE II

Figure 6A:
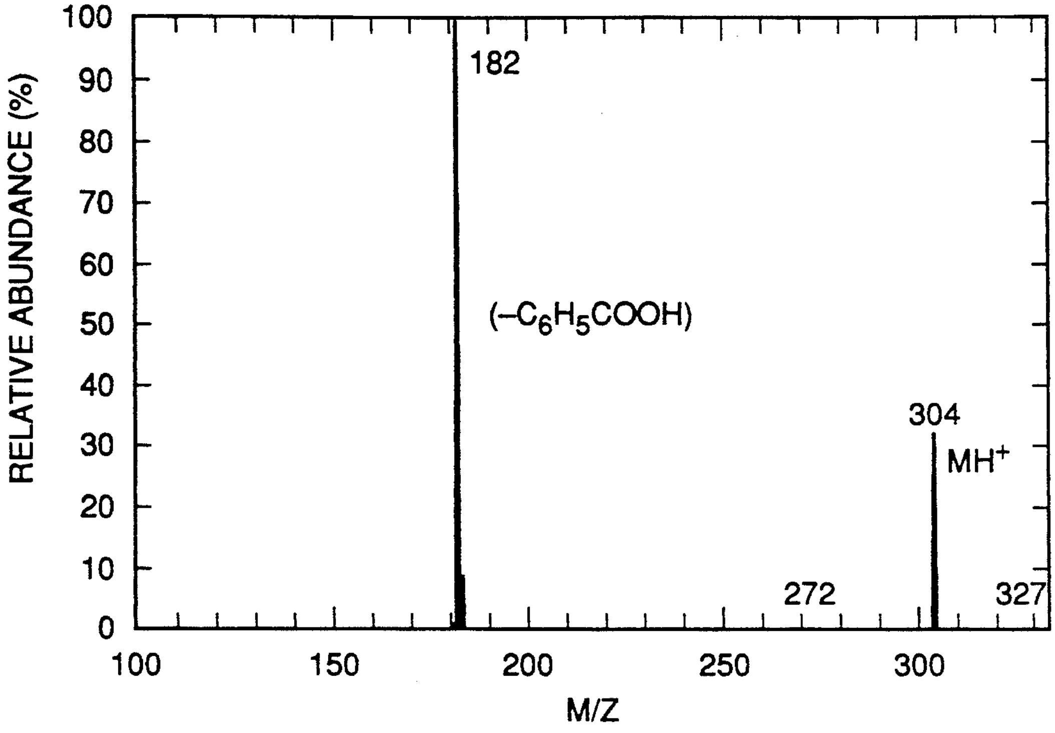
FIG. 6*a* shows the mass spectrum of cocaine acquired using the conventional approach to collisional activation.
Figure 6B:
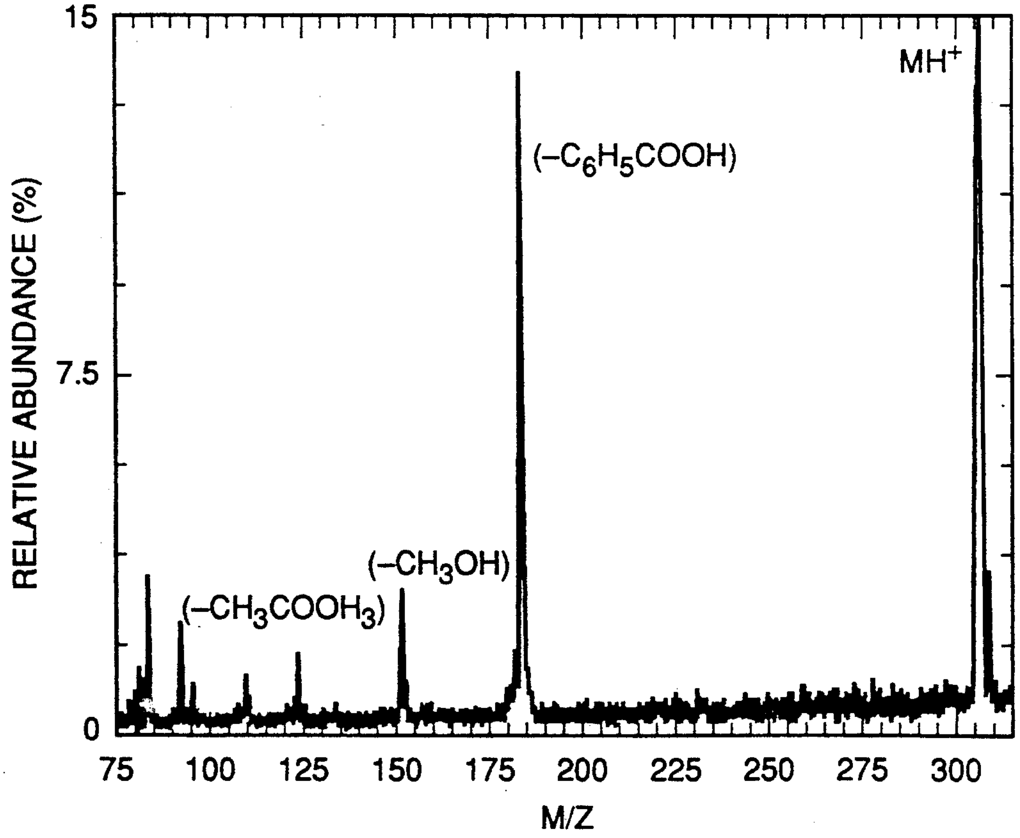
FIG. 6*b* shows the mass spectrum of cocaine acquired according to the present invention.

Cocaine, a well known drug, was analyzed according to the present invention. FIG. 6 illustrates the behavior of a protonated molecule, cocaine, formed by chemical ionization. This compound is obviously of interest for drug detection and identification. FIG. 6*a* shows the spectrum acquired using the conventional approach to collisional activation (viz., single frequency excitation to match the frequency of roughly $10^4$ ions of mass-to-charge 304). Note that the only product ion observed is that due to loss of benzoic acid. This is a structurally significant fragment but identifications are rarely based on a single product ion. Identification could be made with greater confidence if several structurally useful product ions are formed. FIG. 6*b* shows the spectrum acquired with the new method. This spectrum shows, in addition to benzoic acid loss, further losses of methanol and methyl acetate. Similar information would require at least three stages of mass spectrometry with the conventional method.

EXAMPLE III

Figure 7A:
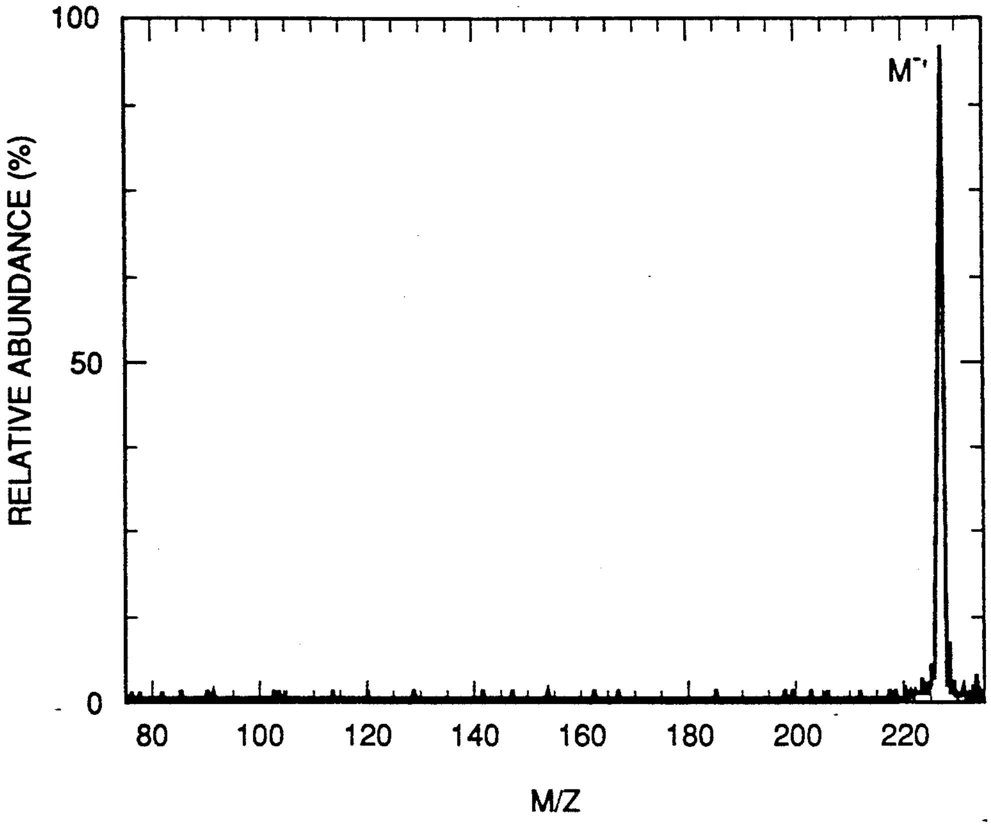
FIG. 7*a* shows the mass spectrum of the isolated molecular anion of 2,4,6-trinitrotoluene, with no activation applied.
Figure 7B:
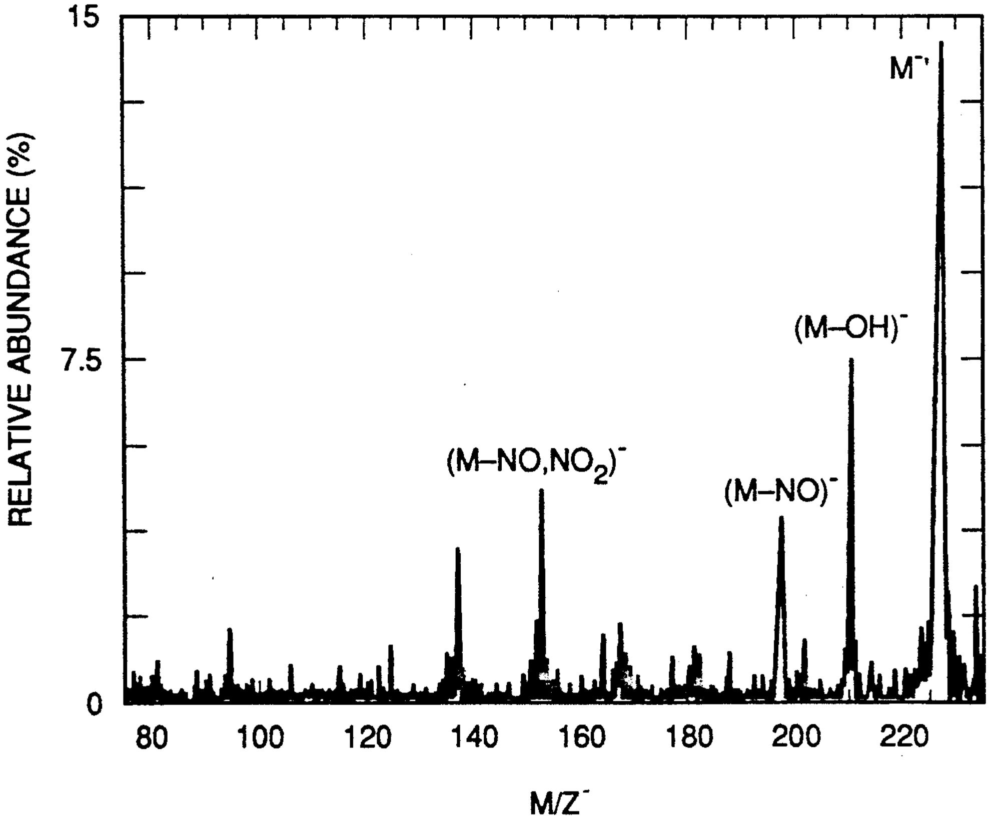
FIG. 7*b* shows the mass spectrum of the same compound acquired according to the present invention.

FIG. 7 illustrates the use of the invention with negatively charged ions. The example shown here is that of the molecular anion of 2,4,6-trinitrotoluene (TNT), a compound of interest for the detection and identification of explosives. FIG. 7*a* shows the spectrum of the isolated molecular anion while 7*b* shows the spectrum after application of the universal collisional activation method. Note the rich fragmentation observed, unique to TNT, that allows for a highly specific identification. The conventional approach (spectrum not shown) provides many fewer product ions.

EXAMPLE IV

Figure 8:
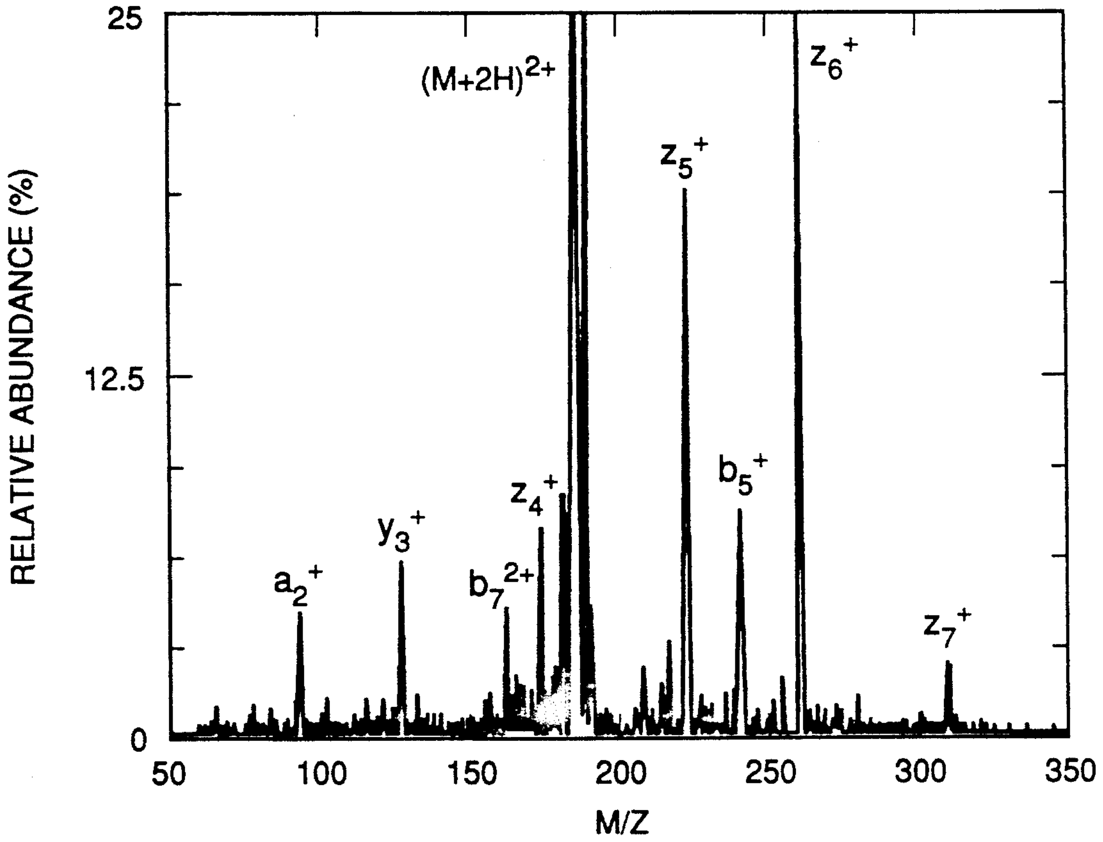
FIG. 8 shows the mass spectrum of the doubly protonated peptide neuromedin U-8 acquired according to the present invention.

FIG. 8 illustrates the use of the invention for a doubly protonated peptide, neuromedin U-8 (tyr-phe-leu-arg-pro-arg-asn-$NH_2$), formed by electrospray ionization. This type of ion is typical of those formed, for example, from a protein tryptic digest. The spectrum shows a variety of structurally informative product ions. The most likely situation in which an ion of this type would be encountered in an analytical setting is from the chromatographic separation of a tryptic digest. In chromatography, of course, the analyte concentration varies as it elutes from the column. The number of ions formed from the analyte would therefore also be expected to vary, unless measure were taken to avoid it. The resonant frequency of the parent ion population would also change during the peak elution. This, however, poses no problem for the universal collisional activation approach although it would for the conventional approach.

While the random noise method provides an extremely wide bandwidth of excitation frequencies, in some cases it may be desirable to use a reduced range of excitation frequencies: this can be effected by using a suitable filter between the random noise generator and the ion trap. A high pass filter could be used to ensure that no ions above a specific mass-to-charge ratio are collisionally activated. This may be desirable in certain MS/MS experiments in which multiply charged ions are the species of interest. A notch filter could also be used to provide a reduced bandwidth of excitation frequencies for collisional activation. The bandwidth of this filter could be adjusted to compensate for the slight shift in the frequencies of ions at a single mass-to-charge ratio due to changes in space charge.

The invention enables the targeted product technique described in S. A. McLuckey, et al., supra, employing collisional activation to be performed with ion trapping instruments. Conventional methods are not applicable because the targeted product ion technique requires simultaneous, non-selective collisional activation of parent ions at multiple mass-to-charge ratios. Kinetic excitation of the product ions, however, may not be desirable. This can be avoided by using an appropriate low-pass filter in conjunction with the random noise excitation. An alternative method is to use a notch rejection filter to exclude excitation frequencies corresponding to the target product ion.

In the quadrupole ion trap, the invention can include concurrent downward ramping of the ion trap radiofrequency drive voltage. This allows low mass ions formed via consecutive dissociation steps to be trapped. The drive voltage (or frequency is an) important variable in determining collision energetics in the ion trap. Frequently, the optimum drive voltage for dissociating a high mass parent ion is too high for trapping ions of lower mass. Random noise fragments formed via consecutive dissociation steps.

A typical mass spectrometry system in accordance with the invention may include support subsystems such as physical support, power supplies, control electronics, vacuum hardware, and ion source; and data acquisition subsystems such as ion detector, electrometer, analog-to-digital converter, computer and data output hardware.

While there has been shown and described what are at present considered the preferred embodiments of the invention, it will be obvious to those skilled in the art that various changes and modifications can be made therein without departing from the scope of the inventions defined by the appended claims.

What is claimed is:

1. A universal collisional activation ion trap comprising an ion trapping means having connected thereto a noise signal generator for effecting universal collisional activation of ions trapped within said ion trapping means, said ion trapping means containing a bath gas for serving as a collision partner for collisional activation and for providing a a mechanism for power dissipation.

2. A universal collisional activation ion trap according to claim 1 wherein said ion trapping means comprises a quadrupole ion trap.

3. A universal collisional activation ion trap according to claim 2 wherein said quadrupole ion trap comprises a ring electrode and two end-cap electrodes.

4. A universal collisional activation ion trap according to claim 3 wherein said noise signal generator is connected to at least one of said two end-cap electrodes of said quadrupole ion trap.

5. A universal collisional activation ion trap according to claim 3 wherein said noise signal generator is connected to said ring electrode of said quadrupole ion trap.

6. A universal collisional activation ion trap according to claim 1 wherein said ion trapping means comprises an ion cyclotron resonance cell.

7. A universal collisional activation ion trap according to claim 6 wherein said ion cyclotron resonance cell comprises at least two opposing electrodes, and wherein said noise signal generator is connected to at least one of said opposing electrodes.

8. A universal collisional activation ion trap according to claim 1 wherein said ion trapping means uses combined magnetic and electrodynamic forces to trap ions.

9. A method of operating a universal collisional activation ion trap comprising the steps of:

a. providing an ion trapping means;

b. introducing into said ion trapping means a bath gas for serving as a collision partner for collisional activation and for providing a mechanism for power dissipation; and c. generating a noise signal within said ion trapping means to effect universal collisional activation of ions trapped therein.

10. The method according to claim 9 further comprising the subsequent step of introducing into said ion trapping means a substance that, when acted upon by said noise signal, undergoes collisional activation to form product ions.

11. A method according to claim 9 wherein said ion trapping means comprises a quadrupole ion trap.

12. A method according to claim 11 wherein said quadrupole ion trap comprises a ring electrode and two end-cap electrodes.

13. A method according to claim 12 wherein said noise signal generator is connected to at least one of said two end-cap electrodes of said quadrupole ion trap.

14. A method according to claim 12 wherein said noise signal generator is connected to said ring electrode of a quadrupole ion trap.

15. A method according to claim 9 wherein said ion trapping means comprises an ion cyclotron resonance cell.

16. A method according to claim 15 wherein said ion cyclotron resonance cell comprises at least two opposing electrodes, and wherein said noise signal generator is connected to at least one of said opposing electrodes.

17. The method according to claim 9 further comprising the subsequent step of acquiring a mass spectrum which contains data useful for identifying said substance.

18. A mass spectrometry system comprising an ion trapping means having connected thereto a noise signal generator for effecting universal collisional activation of ions trapped within said ion trapping means, said trapping means containing a bath gas for serving as a collision partner for collisional activation and for providing a mechanism for power dissipation, support subsystems, and data acquistion subsystems.

* * * * *